US012399587B2

United States Patent
Tao et al.

(10) Patent No.: US 12,399,587 B2
(45) Date of Patent: Aug. 26, 2025

(54) DISPLAY DEVICE AND TOUCH CONTROL METHOD THEREFOR

(71) Applicants: Beijing BOE Technology Development Co., Ltd., Beijing (CN); BOE Technology Group Co., Ltd., Beijing (CN)

(72) Inventors: Yongchun Tao, Beijing (CN); Yuju Chen, Beijing (CN); Yingzi Wang, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/913,801

(22) PCT Filed: Sep. 29, 2021

(86) PCT No.: PCT/CN2021/121745
§ 371 (c)(1),
(2) Date: Sep. 22, 2022

(87) PCT Pub. No.: WO2023/050167
PCT Pub. Date: Apr. 6, 2023

(65) Prior Publication Data
US 2024/0211065 A1 Jun. 27, 2024

(51) Int. Cl.
*G06F 3/041* (2006.01)
*G06F 3/01* (2006.01)

(52) U.S. Cl.
CPC ............ *G06F 3/0416* (2013.01); *G06F 3/016* (2013.01)

(58) Field of Classification Search
CPC .. G06F 3/0416; G06F 3/016; G06F 2203/014; G06F 3/041
See application file for complete search history.

(56) References Cited

U.S. PATENT DOCUMENTS

| 2011/0163985 A1* | 7/2011 | Bae | G06F 3/016 345/173 |
| 2014/0171192 A1* | 6/2014 | Zhou | A63F 13/2145 463/31 |

(Continued)

FOREIGN PATENT DOCUMENTS

| CN | 102117149 A | 7/2011 |
| CN | 103869935 A | 6/2014 |

(Continued)

OTHER PUBLICATIONS

CN 202180002763.8 first office action dated May 30, 2025.

*Primary Examiner* — Jonathan A Boyd
(74) *Attorney, Agent, or Firm* — IPro, PLLC (57) ABSTRACT

Provided are a display device and a touch control method therefor. The display device includes a display panel, a touch screen disposed on the display panel, and a processor connected to the display panel and the touch screen; the display panel including a display area and a non-display area. The display device further comprises: a driver located in the non-display area of the display panel. The processor is further configured to generate, according to the touch position and the touch control action, a modulation signal corresponding to the touch position and the touch control action; and the driver is configured to receive the modulation signal corresponding to the touch position and the touch control action sent by the processor, and drive the touch screen to perform full-screen vibration.

9 Claims, 8 Drawing Sheets (56) References Cited

U.S. PATENT DOCUMENTS

| | | | |
|---|---|---|---|
| 2015/0169059 A1 | 6/2015 | Behles et al. | |
| 2016/0018965 A1* | 1/2016 | Park | G06F 3/0483 715/769 |
| 2019/0087074 A1 | 3/2019 | Oh | |

FOREIGN PATENT DOCUMENTS

| | | |
|---|---|---|
| CN | 109074159 A | 12/2018 |
| CN | 110502142 A | 11/2019 |
| CN | 112181136 A | 1/2021 |
| WO | 2018048518 A1 | 3/2018 |

* cited by examiner

DISPLAY DEVICE AND TOUCH CONTROL METHOD THEREFOR

CROSS-REFERENCE TO RELATED APPLICATIONS

The present application is the U.S. national phase of PCT Application No. PCT/CN2021/121745 filed on Sep. 29, 2021, which is hereby incorporated by reference in its entirety.

TECHNICAL FIELD

The present disclosure relates to the technical field of displaying, and in particular to, a display device and a touch control method therefor.

BACKGROUND

Sight, hearing, touch, smell and taste constitute the five main perception systems of human beings.

In an electronic device such as a mobile phone, a tablet and a notebook computer, a user interacts with an interface through basic operation elements such as a rotatable button, a progress bars and a key. In a product of the related art, when the user interacts with these basic interactive elements, there are generally only visual and auditory interactive feedbacks, sometimes with an additional vibration feedback with a low frequency. The tactile feedback is relatively lacking, and the user cannot perceive a relatively realistic tactile feedback effect.

SUMMARY

In a first aspect of the present disclosure, a display device is provided, including a display panel, a touch screen disposed on the display panel, and a processor connected to the display panel and the touch screen; the display panel including a display area and a non-display area; wherein,
  the touch screen is configured to detect a touch position of a finger in real time and sending the touch position to the processor;
  the processor is configured to determine a touch control action of the finger according to the received touch position of the finger, and controlling the display panel to display according to the touch position and the touch control action;
  the display panel is configured to indicate the touch position under the control of the processor, wherein the display device further includes: a driver located in the non-display area of the display panel;
  the processor is further configured to generate, according to the touch position and the touch control action, a modulation signal corresponding to the touch position and the touch control action; and
  the driver is configured to receive the modulation signal corresponding to the touch position and the touch control action sent by the processor, and to drive the touch screen to perform a full-screen vibration.

Optionally, the display panel is configured to display a progress bar, wherein,
  the progress bar includes N sections, N is a positive integer, each section including one first scale point, a plurality of second scale points and a plurality of scale intervals, the scale interval is located between the one first scale point and a corresponding one of the plurality of second scale points, or between two adjacent scale points of the plurality of second scale points;
  the progress bar further includes a progress bar indicator for indicating the touch position of the finger on the progress bar; and
  the progress bar is a circle or a strip.

Optionally, the touch control action is one of the following: a staying action, a clockwise rotating, a counterclockwise rotating, an action of sliding up and down, and an action of sliding left and right.

Optionally, the processor, when generating, according to the touch position and the touch control action, the modulation signal corresponding to the touch position and the touch control action, is further configured to:
  generate a first modulation signal in a case that the progress bar is a circle or a strip, the touch position is located at the one first scale point of the first to N-th sections, and the touch control action is a staying action; or
  generate a second modulation signal in a case that the progress bar is a circle or a strip, the touch position of the finger is located at a second scale point of the first to N-th sections, and the touch control action is a staying action; or
  generate a third modulation signal in a case that the progress bar is a circle, the touch position of the finger is located in a scale interval of the first to N sections, and the touch control action of the finger is a clockwise rotating or a counterclockwise rotating; or
  generate fourth to (N+3)-th modulation signals in a case that the progress bar is a strip, the touch position of the finger is located in a scale interval of the first to N-th sections, and the touch control action of the finger is an action of sliding up and down or an action of sliding left and right.

Optionally, the first modulation signal and the second modulation signal are the same or different.

Optionally, the first modulation signal and the second modulation signal are both tone burst signals; and
  the first modulation signal and the second modulation signal being different includes: amplitude of the tone burst signal of the first modulation signal is greater than amplitude of the tone burst signal of the second modulation signal;
  wherein the tone burst signal includes one or more full-cycle sinusoidal signals.

Optionally, a frequency of the sinusoidal signal of the tone burst signal ranges from 100 Hz to 1 KHz, and the number of repeated cycles of the tone burst signal ranges from 5 to 20.

Optionally, the third modulation signal is a sinusoidal signal, with a frequency of 20 KHz to 100 KHz, the number of repeated cycles of 200 to 2000, and amplitude of 50 V to 200 V.

Optionally, the fourth to (N+3)-th modulation signals each is a signal of a sinusoidal signal superposed by a Sinc function, and Sinc functions for the fourth to (N+3)-th modulation signals are different in amplitude and frequency.

Optionally, the display panel, when indicating the touch position under the control of the processor, is further configured to:
  indicate the touch position of the finger on the progress bar with the progress bar indicator under the control of the processor.

In a second aspect of the present disclosure, a touch control method for a display device is provided, the display device including a display panel, a touch screen disposed on the display panel, and a processor connected to the display panel and the touch screen; the display panel including a display area and a non-display area; the display device further including: a driver located in the non-display area of the display panel; wherein the method includes:

detecting a touch position of a finger in real time and sending the touch position to the processor;
  determining a touch control action of the finger according to the received touch position of the finger, and controlling the display panel to display according to the touch position and the touch control action;
  indicating the touch position under the control of the processor,
  generating, according to the touch position and the touch control action, a modulation signal corresponding to the touch position and the touch control action; and
  receiving the modulation signal corresponding to the touch position and the touch control action sent by the processor, and driving the touch screen to perform a full-screen vibration.

Optionally, the display panel is configured to display a progress bar;

the progress bar includes N sections, N is a positive integer, each section including: one first scale point, a plurality of second scale points and a plurality of scale intervals, the scale interval is located between the one first scale point and a corresponding one of the plurality of second scale points, or between two adjacent scale points of the plurality of second scale points;
  the progress bar further includes a progress bar indicator for indicating the touch position of the finger on the progress bar; and
  the progress bar is a circle or a strip.

REFERENCE NUMERALS

1 first scale point
2 second scale point
3 scale interval
4 progress bar indicator
5 progress bar of circle
6 progress bar of strip

DETAILED DESCRIPTION

To make the technical problem to be solved, the technical solution, and advantages according to the embodiments of the present disclosure become clear, a detailed description will be given below with reference to the accompanying drawings and specific embodiments.

An embodiment of the present disclosure provides a display device, including: a display panel, a touch screen disposed on the display panel, and a processor connected to the display panel and the touch screen; the display panel including a display area and a non-display area; wherein
  the touch screen is configured to detect a touch position of a finger in real time and sending the touch position to the processor;
  the processor is configured to determine a touch control action of the finger according to the received touch position of the finger, and control the display panel to display according to the touch position and the touch control action;
  the display panel is configured to indicate the touch position under the control of the processor, wherein,
  the display device further includes a driver, the driver is located in the non-display area of the display panel;
  the processor is further configured to generate, according to the touch position and the touch control action, a modulation signal corresponding to the touch position and the touch control action; and
  the driver is configured to receive the modulation signal corresponding to the touch position and the touch control action sent by the processor, and to drive the touch screen to vibrate in a full screen manner.

Optionally, the display panel is configured to display a progress bar;

the progress bar includes N sections, N is a positive integer, each section includes one first scale point, a plurality of second scale points and a plurality of scale intervals, the scale interval is located between the one first scale point and a corresponding one of the plurality of second scale points, or between every two adjacent scale points of the plurality of second scale points;
  the progress bar further includes a progress bar indicator for indicating the touch position of the finger on the progress bar; and
  the progress bar is a circle or a strip.

Optionally, the touch control action is one of a staying action, a clockwise rotating, a counterclockwise rotating, an action of sliding up and down, and an action of sliding left and right.

Optionally, the processor, when being configured to generate a modulation signal corresponding to the touch position and the touch control action according to the touch position and the touch control action, is further configured to:
generate a first modulation signal in a case that the progress bar is a circle or a strip, the touch position is located at the one first scale point of the first to N-th sections, and the touch control action is a staying action; or
generate a second modulation signal in a case that the progress bar is a circle or a strip, the touch position of the finger is located at one of the second scale points of the first to N-th sections, and the touch control action is a staying action; or
generate a third modulation signal in a case that the progress bar is a circle, the touch position of the finger is located in one of the scale intervals of the first to N sections, and the touch control action of the finger is a clockwise rotating or a counterclockwise rotating; or
generate fourth to (N+3)-th modulation signals in a case that the progress bar is a strip, the touch position of the finger is located in one of the scale intervals of the first to N-th sections, and the touch control action of the finger is an action of sliding up and down or an action of sliding left and right.

Optionally, the first modulation signal and the second modulation signal are the same or different.

Optionally, the first modulation signal and the second modulation signal are both tone burst signals; and
the first modulation signal and the second modulation signal being different includes: amplitude of the tone burst signal of the first modulation signal is greater than amplitude of the tone burst signal of the second modulation signal;
wherein the tone burst signal is composed of one or more fill-cycle sinusoidal signals.

Optionally, a frequency of the sinusoidal signal of the tone burst signal ranges from 100 Hz to 1 KHz, and the number of repeated cycles of the tone burst signal ranges from 5 to 20.

Optionally, the third modulation signal is a sinusoidal signal, a frequency of the third modulation signal ranges from 20 KHz to 100 KHz, the number of repeated cycles of the third modulation signal ranges from 200 to 2000, and amplitude of the third modulation signal ranges from 50 V to 200 V.

Optionally, the fourth to (N+3)-th modulation signals each is a signal including a sinusoidal signal superimposed by a Sinc function, and Sinc functions for the fourth to (N+3)-th modulation signals are different in amplitude and frequency.

Optionally, the display panel, when being configured to indicate the touch position under the control of the processor, is further configured to:
indicate the touch position of the finger on the progress bar by means of the progress bar indicator under the control of the processor.

Figure 1:
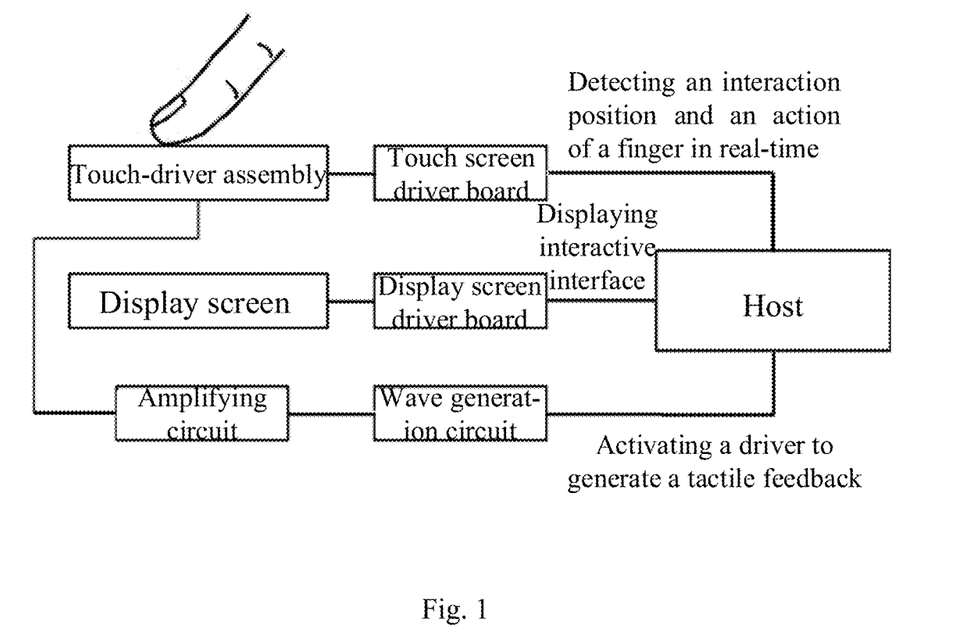
FIG. 1 is a schematic diagram showing modules of a display device according to an embodiment of the present disclosure.
Figure 2:
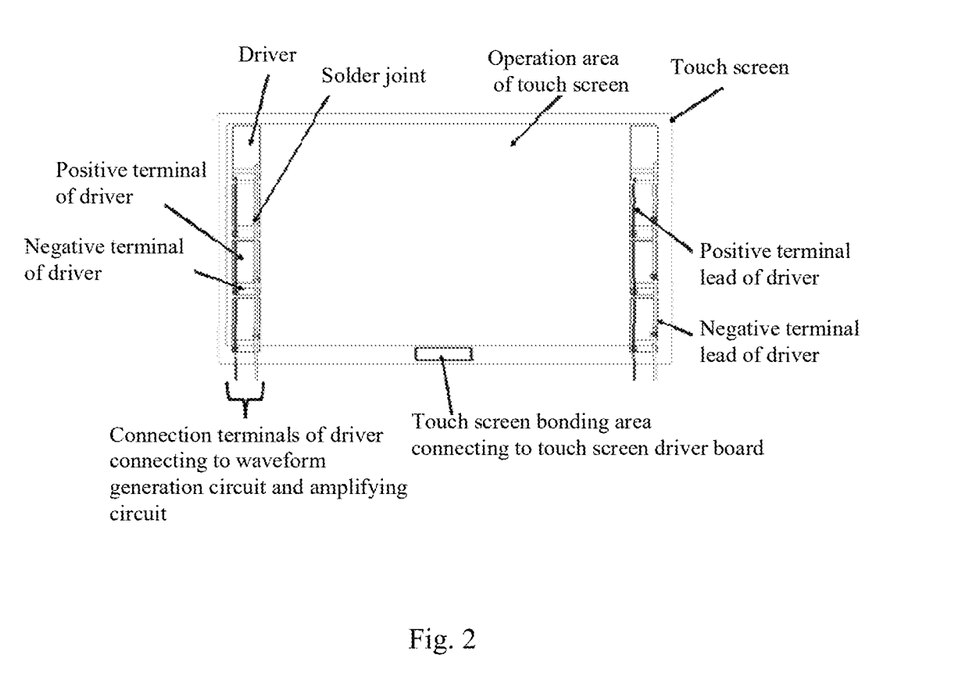
FIG. 2 is a schematic structural diagram of a display device according to an embodiment of the present disclosure.

FIG. 1 is a schematic diagram showing modules of a display device according to an embodiment of the present disclosure, and FIG. 2 is a schematic diagram showing a structure of a display device according to an embodiment of the present disclosure.

Referring to FIGS. 1 and 2, the display device includes a display panel including a display screen and a display screen driver board. The display panel includes a display area and a non-display area.

The display device further includes a touch screen and a touch screen driver board, and the touch screen includes a touch screen operating area and a touch screen non-operating area, in which the touch screen non-operating area including a touch screen bonding area which is connected to the touch screen driver board.

The display device further includes a driver disposed between the display panel and the touch screen, and the driver is located in the non-display area of the display panel and adhered to a surface of the touch screen opposite to the display panel. Since the touch screen and the driver are bonded together, they can be collectively referred to as a touch-driver assembly.

The driver includes a positive terminal and a negative terminal, the positive terminal is connected to a positive terminal lead, the negative terminal is connected to a negative terminal lead, the positive terminal lead and the negative terminal lead are connected to a waveform generation circuit and an amplifying circuit.

Among others, the touch screen driver board, the display screen driver board, and the waveform generation circuit are connected to a host. The host includes a processor.

The operating process of the display device is as follows. An interactive interface is displayed on the display screen under the control of the software on the host, and an interaction position and action of a finger is detected in real-time through the touch screen and touch screen driver board. The host generates a corresponding modulation signal according to the interaction position and action, so as to drive the driver to drive the touch screen to perform a full-screen vibration, in which a vibratory tactile feedback is generated with a low-frequency signal, and a surface tactile feedback is generated by changing the friction with a squeeze film effect generated by the sine wave signal in the ultrasonic frequency band.

Figure 3:
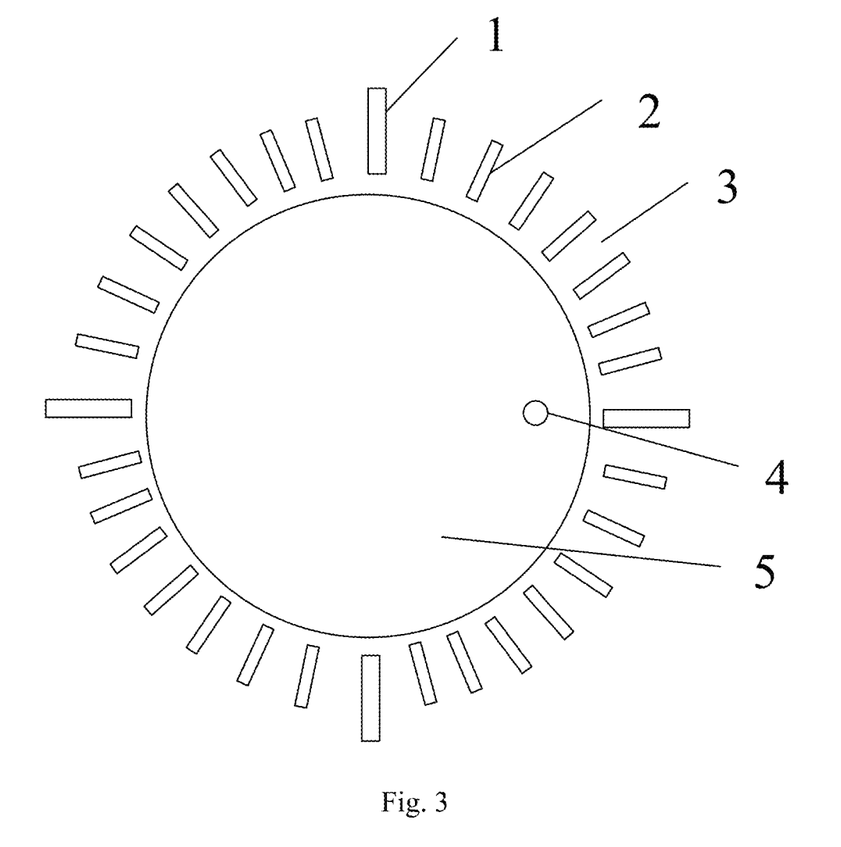
FIG. 3 is a schematic diagram showing a display interface of a first circular progress bar according to an embodiment of the present disclosure.

FIG. 3 is a schematic diagram showing a display interface of a first circular progress bar according to an embodiment of the present disclosure. The circular progress bar 5 includes four sections, each section includes: one first scale point 1, seven second scale points 2, and eight scale intervals 3. Each scale interval has the same size, and the second scale points in each section are evenly distributed. The first scale point 1 is a thick scale point, and the second scale points 2 each is a thin scale point.

As shown in FIG. 3, the circular progress bar may function as a rotatable button. The progress bar indicator 4 is a rotatable button indicator.

Figure 11:
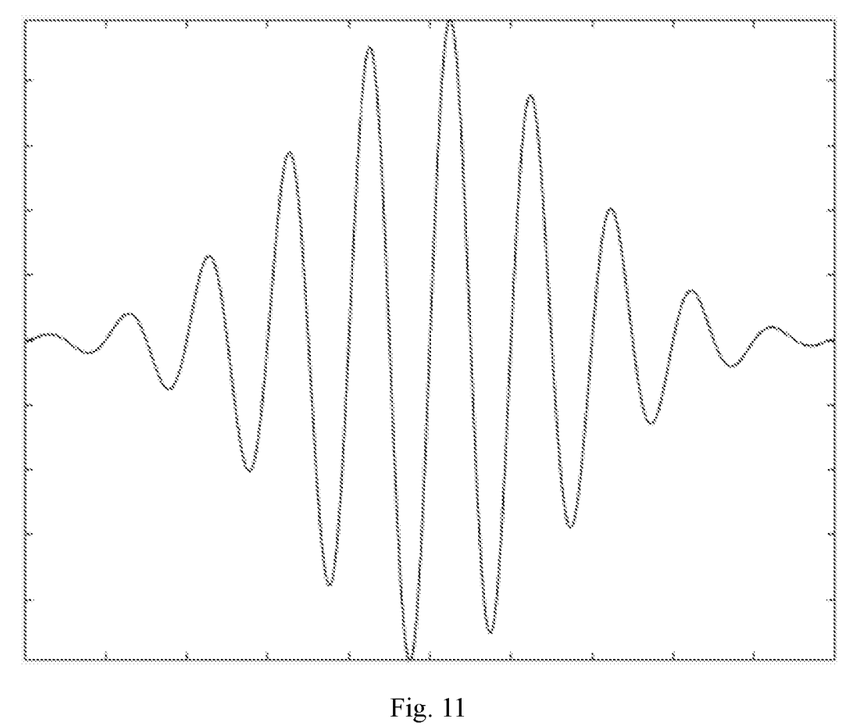
FIG. 11 is a schematic diagram showing a tone burst signal according to an embodiment of the present disclosure.
Figure 12:
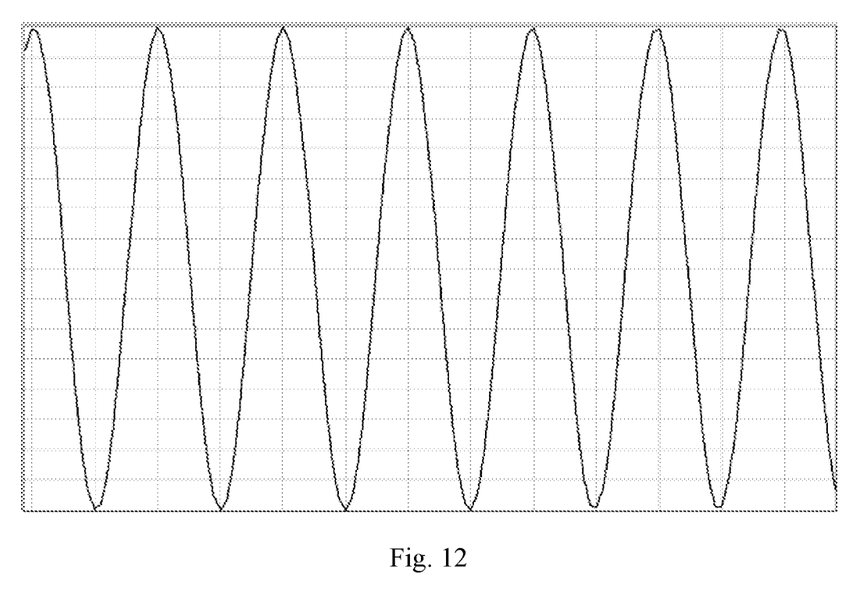
FIG. 12 is a schematic diagram showing a continuous sine wave signal according to an embodiment of the present disclosure.

During user interaction, when the rotatable button indicator 4 is rotated to different areas for the thick scale point, the thin scale points and the scale intervals, different tactile feedbacks may be generated. when being at the thick scale point and the thin scale points, a feedback of vibration signal is generated using a tone burst signal as shown in FIG. 11, the tone burst signal having a carrier frequency in the low frequency range (100 Hz to 1 kHz, with an example value of 150 Hz, 230 Hz, etc.). Each tone burst signal contains 5 to 20 (for example, 10) cycles of carrier signals. The amplitude of the tone burst signal is relatively higher (e.g., 20 V) when being at the thick scale point, to produce a stronger vibratory tactile feedback. The amplitude of the tone burst signal is for example 15 V when being at a thin scale point, to produce a relatively weak vibratory tactile feedback. When the rotatable button indicator is rotated to be within the scale interval, a continuous wave in the ultrasonic wave band (20 kHz to 100 kHz, for example, 23.4 kHz) shown in FIG. 12 is applied to the driver, and the continuous wave is repeated for 200 to 2000 cycles (for example, 1000 cycles), with amplitude of 50 to 200 Vpp (for example, 90 Vpp), so as to generate the squeeze film effect to change the surface friction, an thus to provide the user with a feeling that the finger slides directly from one scale point to the next scale point.

By using the sine wave signal in the ultrasonic wave band to generate the squeeze film effect and thus to change the surface friction in the scale intervals of the rotatable button, an effect of sliding between different scale points can be generated.

Figure 4:
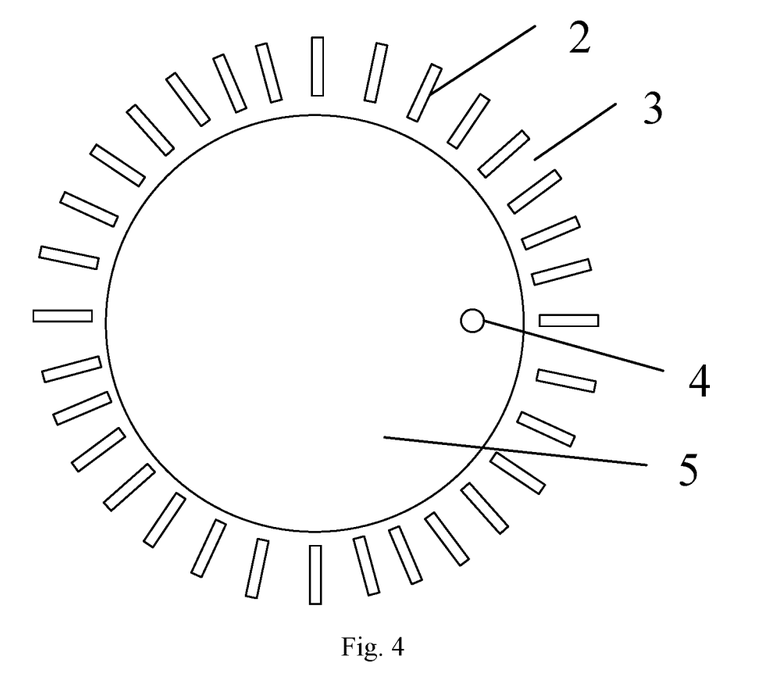
FIG. 4 is a schematic diagram showing a display interface of a second circular progress bar according to an embodiment of the present disclosure.

FIG. 4 is a schematic diagram showing a display interface of a second circular progress bar according to an embodiment of the present disclosure. The circular progress bar 5 includes a plurality of second scale points 2 and a plurality of scale intervals 3. Each scale interval has the same size, and the second scale points are evenly distributed. The circular progress bar may function as a rotatable button. The progress bar indicator 4 is a rotatable button indicator.

During user interaction, when the rotatable button indicator 4 is rotated to different areas of the thin scale points and the scale intervals 3, different tactile feedbacks may be generated. When being at the thin scale point, a feedback of vibration signal is generated by a tone burst signal as shown in FIG. 11, the tone burst signal having a carrier frequency in the low frequency range (100 Hz to 1 kHz, for example, 150 Hz, 230 Hz, etc.). Each tone burst signal contains 5 to 20 (for example, 10) cycles of carrier signals. The amplitude of the tone burst signal is for example 15 V, to produce a vibratory tactile feedback. When the rotatable button indicator is rotated to the scale interval, a continuous wave in the ultrasonic wave band (20 kHz to 100 kHz, for example, 23.4 kHz) as shown in FIG. 12 is applied to the driver, and the continuous wave is repeated for 200 to 2000 cycles (for example, 800 cycles), with amplitude of 50 to 200 Vpp (for example, 80 Vpp), so as to generate the squeeze film effect to change the surface friction, thereby providing the user with a feeling that the finger slides quickly between different scale points.

By using the sine wave signal in the ultrasonic wave band to generate the squeeze film effect and thus to change the surface friction when being in the scale intervals of the rotatable button, an effect of sliding between different scale points can be generated.

Figure 5:
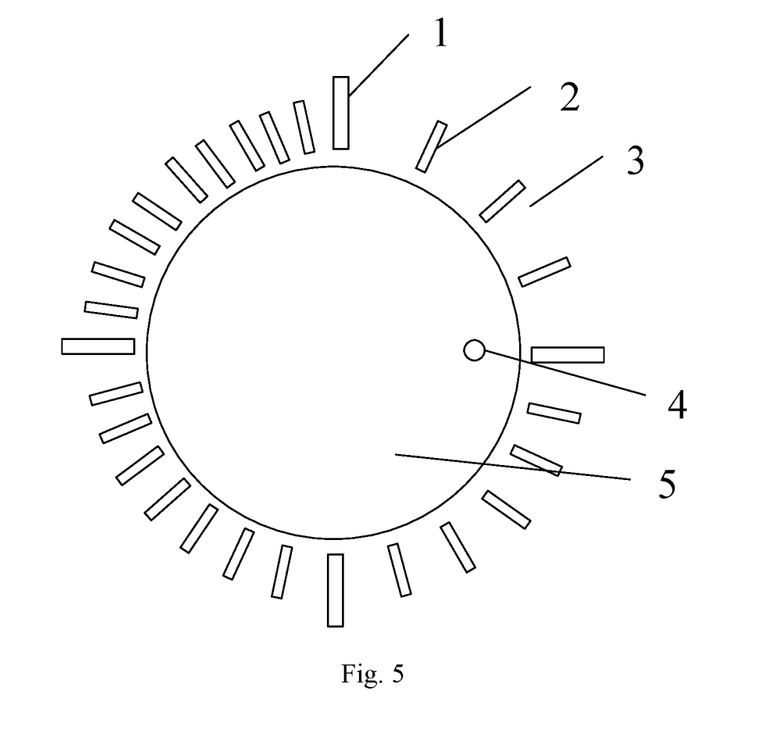
FIG. 5 is a schematic diagram showing a display interface of a third circular progress bar according to an embodiment of the present disclosure.

FIG. 5 is a schematic diagram showing a display interface of a third circular progress bar according to an embodiment of the present disclosure. The circular progress bar 5 includes four sections, in which a first section includes: one first scale point 1, three second scale points 2, and four scale intervals 3; a second section includes: one first scale point 1, five second scale points 2, and six scale intervals 3; a third section includes: one first scale point 1, seven second scale points 2, and eight scale intervals 3; and a fourth section includes: one first scale point 1, nine second scale points 2, and ten scale intervals 3. The first scale point 1 is a thick scale point, and the second scale points 2 each is a thin scale point. In the same section, each scale interval has the same size, and the second scale points in each section are evenly distributed. However, in the clockwise direction, the sizes of the scale intervals for different sections gradually reduce, and the distributions of the second scale points in different sections gradually become denser.

Figure 13:
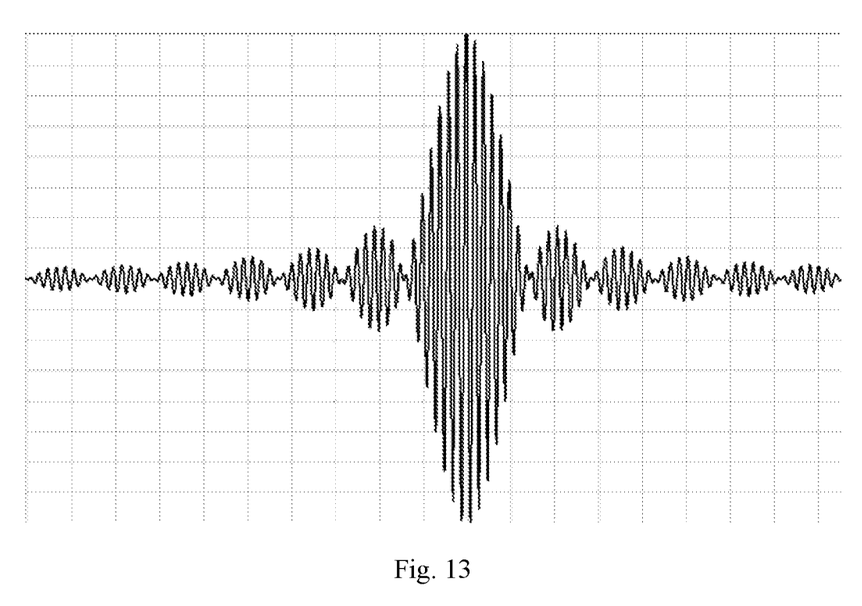
FIG. 13 is a schematic diagram showing a Sinc plus sin function modulated waveform according an embodiment of the present disclosure.

During user interaction, when the rotatable button indicator 4 is rotated to different areas of the thick scale points, the thin scale points and the scale intervals, different tactile feedbacks may be generated. At the thick scale points and the thin scale points, a feedback of vibration signal is generated by a tone burst signal shown as in FIG. 11, the tone burst signal having a carrier frequency in the low frequency range (100 Hz to 1 kHz, for example, 150 Hz, 230 Hz, etc.). Each tone burst signal contains 5 to 20 (for example, 10) cycles of carrier signals. The amplitude of the tone burst signal is relatively higher (for example, 20 V) when being at the thick scale point, to produce a stronger vibratory tactile feedback. The amplitude of the tone burst signal at the thin scale point is for example 15 V, to produce a relatively weak vibratory tactile feedback. When the rotatable button indicator is rotated to be within the scale interval, a sine wave waveform modulated by a Sinc function in the ultrasonic wave band (20 kHz to 100 kHz, for example, 23.4 kHz) as shown in FIG. 13 is applied to the driver, so as to generate the squeeze film effect to change the surface friction to generate a feeling for stripes. The whole rotatable button is divided into multiple regions (3 to 20, for example, 4) according to the number of thick scale points, and the amplitude and frequency of the waveform modulated by Sinc function in each region are different, so as to generate a feeling that the density of stripes change from sparse to dense by a feedback from weak to strong. In an example in which four regions is included, for the four regions, the amplitude of the waveform modulated by Sinc function is 60, 70, 80 and 90 Vpp, respectively, and the frequency is 5 Hz, 10 Hz, 15 Hz and 20 Hz, respectively.

Figure 6:
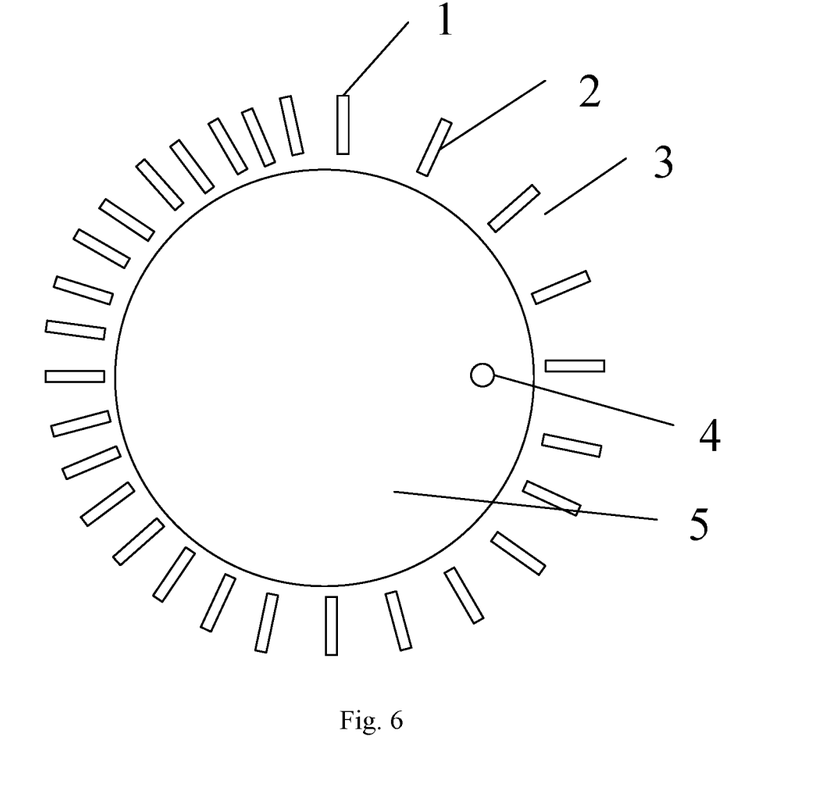
FIG. 6 is a schematic diagram showing a display interface of a fourth circular progress bar according to an embodiment of the present disclosure.

FIG. 6 is a schematic diagram showing a display interface of a fourth circular progress bar according to an embodiment of the present disclosure, where in FIG. 6, the first scale point of each section in FIG. 5 is replaced by a second scale point.

During user interaction, when the rotatable button indicator 4 is rotated to different areas of the thin scale points and the scale intervals 3, different tactile feedbacks may be generated. When being at the thin scale point, a feedback of vibration signal is generated by a tone burst signal as shown in FIG. 11, the tone burst signal having a carrier frequency in the low frequency range (100 Hz to 1 kHz, for example, 150 Hz, 230 Hz, etc.). Each tone burst signal contains 5 to 20 (for example, 10) cycles of carrier signals. The amplitude of the tone burst signal is for example, 15 V to produce a vibratory tactile feedback. When the rotatable button indicator is rotated to the scale interval, a sine waveform modulated by Sinc function in the ultrasonic wave band (20 kHz to 100 kHz, for example, 23.4 kHz) as shown in FIG. 13 is applied to the driver, so as to generate the squeeze film effect to change the surface friction, and thus generating a feeling of stripes. The whole rotatable button is divided into multiple regions (3 to 20, for example, 4) according to the number of thick scale points, and the amplitude and frequency of waveform modulated by Sinc function in each region are different, so as to generate a feeling that the density of stripes change from sparse to dense, and the corresponding feedback from weak to strong. In an example in which four regions are included, for the four regions, the amplitude of the waveform modulated by Sinc function is 60, 70, 80 and 90 Vpp, respectively, and the frequency is 5 Hz, 10 Hz, 15 Hz and 20 Hz, respectively.

It should be noted that in the circular progress bar provided by the embodiments of the present disclosure, no thick scale point but only thin scale points are included, when the first modulation signal and the second modulation signal are the same, i.e., the modulation signals applied for the first scale points and the second scale points are the same. The circular progress bar provided by the embodiments of the present disclosure may be designed, such that the thin scale points have a gradually increasing and continuously varying density in a clockwise direction.

Figure 7:
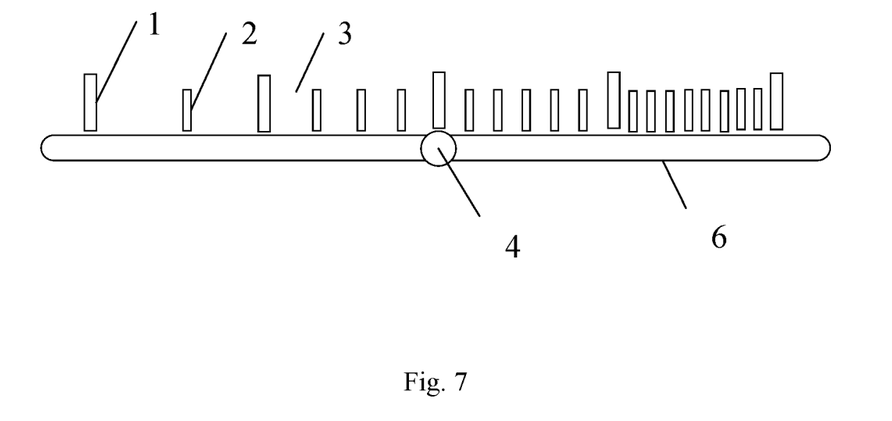
FIG. 7 is a schematic diagram showing a display interface of a first strip-shaped progress bar according to an embodiment of the present disclosure.

FIG. 7 is a schematic diagram showing a display interface of a first strip-shaped progress bar according to an embodiment of the present disclosure, The strip-shaped progress bar 5 includes four sections, in which a first section includes: one first scale point 1, one second scale point 2, and two scale intervals 3; a second section includes: one first scale point 1, three second scale points 2, and four scale sections 3; a third section includes: one first scale point 1, five second scale points 2, and six scale sections 3; and a fourth section includes: one first scale point 1, seven second scale points 2, and eight scale sections 3. The first scale point 1 is a thick scale point, and the second scale point 2 is a thin scale point. In the same section, each scale interval has the same size, and the second scale points are evenly distributed in each section. However, in the direction from left to right, the size for the scale intervals in different sections gradually reduces, and the distributions of the second scale points in different sections gradually becomes denser.

During user interaction, when a progress bar indicator slides to different areas of the thick scale points, the thin scale points and the scale intervals, different tactile feedbacks may be generated. When being at the thick scale point and the thin scale point, a feedback of vibration signal is generated by using a tone burst signal as shown in FIG. 11, the tone burst signal having a carrier frequency in the low frequency range (100 Hz to 1 kHz, for example, 150 Hz, 230 Hz, etc.). Each tone burst signal contains 5 to 20 (for example, 10) cycles of carrier signals. When being at the thick scale point, the amplitude of the tone burst signal is relatively higher (e.g., 20 V) to produce a stronger vibratory tactile feedback. When being at the thin scale point, the amplitude of the tone burst signal is 15 V, to produce a relatively weak vibratory tactile feedback. When the progress bar indicator slides to be within the scale interval, a sine wave form modulated by Sinc function in the ultrasonic wave band (20 kHz to 100 kHz, for example, 23.4 kHz) as shown in FIG. 13 is applied to the driver, so as to generate the squeeze film effect to change the surface friction, thereby generating a feeling of stripes. The whole progress bar is divided into multiple regions (3 to 20, for example, 4) according to the number of thick scale points, and the amplitude and frequency of the waveform modulated by Sinc function in each region are different, so as to generate a feeling that the density of stripes change from sparse to dense, and the corresponding feedback changes from weak to strong. In an example in which there are four regions, for the four regions, the amplitude of the waveform modulated by Sinc function is 60, 70, 80 and 90 Vpp, respectively, and the frequency is 5 Hz, 10 Hz, 15 Hz and 20 Hz, respectively.

According to the embodiments provided by the present disclosure, with the waveform modulated by Sinc function, a feeling that the stripes change from sparse to dense and from weak to strong can be generated.

Figure 8:
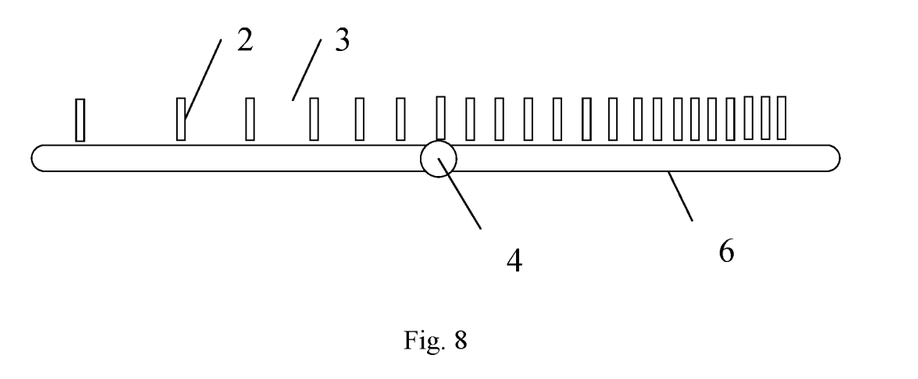
FIG. 8 is a schematic diagram showing a display interface of a second strip-shaped progress bar according to an embodiment of the present disclosure.

FIG. 8 is a schematic diagram showing a display interface of a second strip-shaped progress bar according to an embodiment of the present disclosure, where in FIG. 8, the first scale point of each section in FIG. 7 is replaced by a second scale point.

During user interaction, when a progress bar indicator slides to different areas of the thin scale points and the scale intervals, different tactile feedbacks may be generated. When being at the thin scale point, a feedback of vibration signal is generated by a tone burst signal as shown in FIG. 11, the tone burst signal having a carrier frequency in the low frequency range (100 Hz to 1 kHz, for example, 150 Hz, 230 Hz, etc.). Each tone burst signal contains 5 to 20 (for example, 10) cycles of carrier signals. The amplitude of the tone burst signal is 15 V to produce a vibratory tactile feedback. When the progress bar indicator slides to be within the scale interval, a sine waveform modulated by Sinc function in the ultrasonic wave band (20 kHz to 100 kHz, for example, 23.4 kHz) as shown in FIG. 13 is applied to the driver, so as to generate the squeeze film effect to change the surface friction, and thus generating a feeling of stripes. The whole progress bar is divided into multiple regions (3 to 20, for example, 4) according to the number of thick scale points, and the amplitude and frequency of waveform modulated by Sinc function in each region are different, so as to generate a feeling that the density of stripes change from sparse to dense and from weak to strong. In an example in which there are four regions, for the four regions, the amplitude of the waveform modulated by Sinc function is 60, 70, 80 and 90 Vpp, respectively, and the frequency is 5 Hz, 10 Hz, 15 Hz and 20 Hz, respectively.

Figure 9:
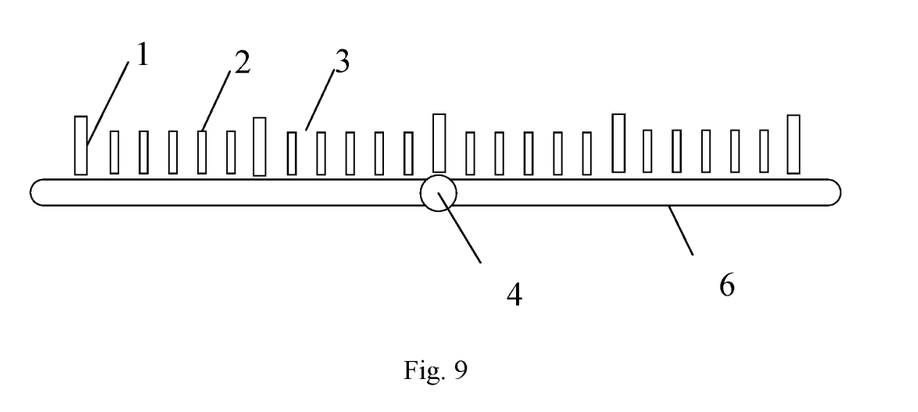
FIG. 9 is a schematic diagram showing a display interface of a third strip-shaped progress bar according to an embodiment of the present disclosure.

FIG. 9 is a schematic diagram showing a display interface of a third strip-shaped progress bar according to an embodiment of the present disclosure. The strip-shaped progress bar 5 includes four sections, each section including: one first scale point 1, five second scale points 2, and six scale intervals 3. Each scale interval has the same size, and the second scale points in each section are evenly distributed. The first scale point 1 is a thick scale point, and the second scale point 2 is a thin scale point.

During user interaction, when the rotatable button indicator 4 is moved to different areas of the thick scale points, the thin scale points and the scale intervals, different tactile feedbacks may be generated. When being the thick scale point and the thin scale point, a feedback of vibration signal is generated by using a tone burst signal as shown in FIG. 11, the tone burst signal having a carrier frequency in the low frequency range (100 Hz to 1 kHz, for example, 150 Hz, 230 Hz, etc.). Each tone burst signal contains 5 to 20 (for example, 10) cycles of carrier signals. When being at the thick scale point, the amplitude of the tone burst signal is relatively higher (e.g., 20 V), to produce a stronger vibratory tactile feedback. When being at the thin scale point, the amplitude of the tone burst signal is 15 V to produce a relatively weak vibratory tactile feedback. When the rotatable button indicator is moved to be within the scale interval, a continuous wave in the ultrasonic wave band (20 kHz to 100 kHz, for example, 23.4 kHz) as shown in FIG. 12 is applied to the driver, and the continuous wave is repeated for 200 to 2000 cycles (for example, 1000 cycles), with amplitude of 50 to 200 Vpp (for example, 90 Vpp), so as to generate the squeeze film effect to change the surface friction, thereby providing the user with a feeling that the finger slides directly from one scale point to the next scale point.

When being within the scale interval of the progress bar, by using the continuous waveform in the ultrasonic wave band to generate the squeeze film effect and thus to change the surface friction, an effect of sliding between different scale points can be generated.

Figure 10:
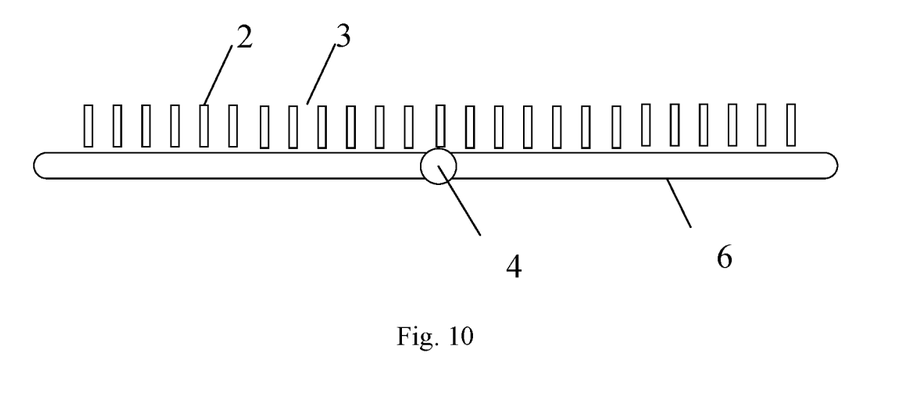
FIG. 10 is a schematic diagram showing a display interface of a fourth strip-shaped progress bar according to an embodiment of the present disclosure.

FIG. 10 is a schematic diagram showing a display interface of a fourth strip-shaped progress bar according to an embodiment of the present disclosure, where in FIG. 10, the first scale point of each section in FIG. 9 is replaced by a second scale point.

During user interaction, when the progress bar indicator 4 is moved to different areas of the thin scale points and the scale intervals 3, different tactile feedbacks may be generated. When being at the thin scale points, a feedback of vibration signal is generated by using a tone burst signal as shown in FIG. 11, the tone burst signal having a carrier frequency in the low frequency range (100 Hz to 1 kHz, for example, 150 Hz, 230 Hz, etc.). Each tone burst signal contains 5 to 20 (for example, 10) cycles of carrier signals. The amplitude of the tone burst signal is 15 V to produce a vibratory tactile feedback. When the progress bar indicator is moved to be within the scale interval, a continuous wave in the ultrasonic wave band (20 kHz to 100 kHz, for example, 23.4 kHz) as shown in FIG. 12 is applied to the driver, and the continuous wave is repeated for 200 to 2000 cycles (for example, 800 cycles), with amplitude of 50 to 200 Vpp (for example, 80 Vpp), so as to generate the squeeze film effect to change the surface friction, thereby providing the user with a feeling that the finger slides quickly between different scale points.

When being within the scale interval of the progress bar, by using the continuous waveform in the ultrasonic wave band to generate the squeeze film effect and thus to change the surface friction, an effect of sliding between different scale points can be generated.

It should be noted that the strip-shaped progress bar provided by the embodiments of the present disclosure may also be designed to have only thin scale points without any thick scale points, and the thin scale points are distributed gradually denser with a continuously varying density in the direction from left to right.

An embodiment of the present disclosure provides a touch control method for a display device, the display device including a display panel, a touch screen disposed on the display panel, and a processor connected to the display panel and the touch screen; the display panel including a display area and a non-display area; the display device further including: a driver located in the non-display area of the display panel; wherein the method includes:
  detecting a touch position of a finger in real time and sending the touch position to the processor;
  determining a touch control action of the finger according to the received touch position of the finger, and controlling the display panel to display according to the touch position and the touch control action;
  indicating the touch position under the control of the processor;
  generating, according to the touch position and the touch control action, a modulation signal corresponding to the touch position and the touch control action; and
  receiving the modulation signal corresponding to the touch position and the touch control action sent by the processor, and driving the touch screen to perform a full-screen vibration.

Optionally, the display panel is configured to display a progress bar;
  the progress bar includes N sections, N is a positive integer, each section includes one first scale point, a plurality of second scale points, and a plurality of scale intervals, one of the plurality of scale intervals is located between the one first scale point and a corresponding one of the plurality of second scale points, or between every two adjacent scale points of the plurality of second scale points;
  the progress bar further includes a progress bar indicator for indicating the touch position of the finger on the progress bar; and
  the progress bar is a circle or a strip.

Optionally, the touch control action is one of a staying action, a clockwise rotating, a counterclockwise rotating, an action of sliding up and down, or an action of sliding left and right.

Optionally, the step of generating, according to the touch position and the touch control action, a modulation signal corresponding to the touch position and the touch control action, further includes:
  generate a first modulation signal in a case that the progress bar is a circle or a strip, the touch position is located at a first scale point in the first to N-th sections, and the touch control action is a staying action; or
  generate a second modulation signal in a case that the progress bar is the circle or the strip, the touch position of the finger is located at a second scale point in the first to N-th sections, and the touch control action is the staying action; or
  generate a third modulation signal in a case that the progress bar is the circle, the touch position of the finger is located at a scale interval in the first to N sections, and the touch control action of the finger is a clockwise rotating or a counterclockwise rotating; or
  generate fourth to (N+3)-th modulation signals in a case that the progress bar is in strip-shaped, the touch position of the finger is located in the scale intervals of the first to N-th sections, and the touch control action of the finger is an action of sliding up and down or an action of sliding left and right.

Optionally, the first modulation signal is the same as or different from the second modulation signal.

Optionally, the first modulation signal and the second modulation signal are both tone burst signals; and
  the first modulation signal being different from the second modulation signal, includes: the amplitude of the tone burst signal of the first modulation signal is greater than the amplitude of the tone burst signal of the second modulation signal;
  wherein the tone burst signal is composed of one or more fill-cycle sinusoidal signals.

Optionally, the frequency of the sinusoidal signal of the tone burst signal ranges from 100 Hz to 1 KHz, and the number of repeated cycles of the tone burst signal ranges from 5 to 20.

Optionally, the third modulation signal is a sinusoidal signal, with a frequency of 20 KHz to 100 KHz, the number of repeated cycles of 200 to 2000, and amplitude of 50 V to 200 V.

Optionally, the fourth to (N+3)-th modulation signals each is a signal of a sinusoidal signal superimposed by a Sinc function, and Sinc functions for the fourth to (N+3)-th modulation signals are different in amplitude frequency.

Optionally, the step of indicating the touch position under the control of the processor, further includes:
  indicating the touch position of the finger on the progress bar by means of the progress bar indicator under the control of the processor.

Figure 14:
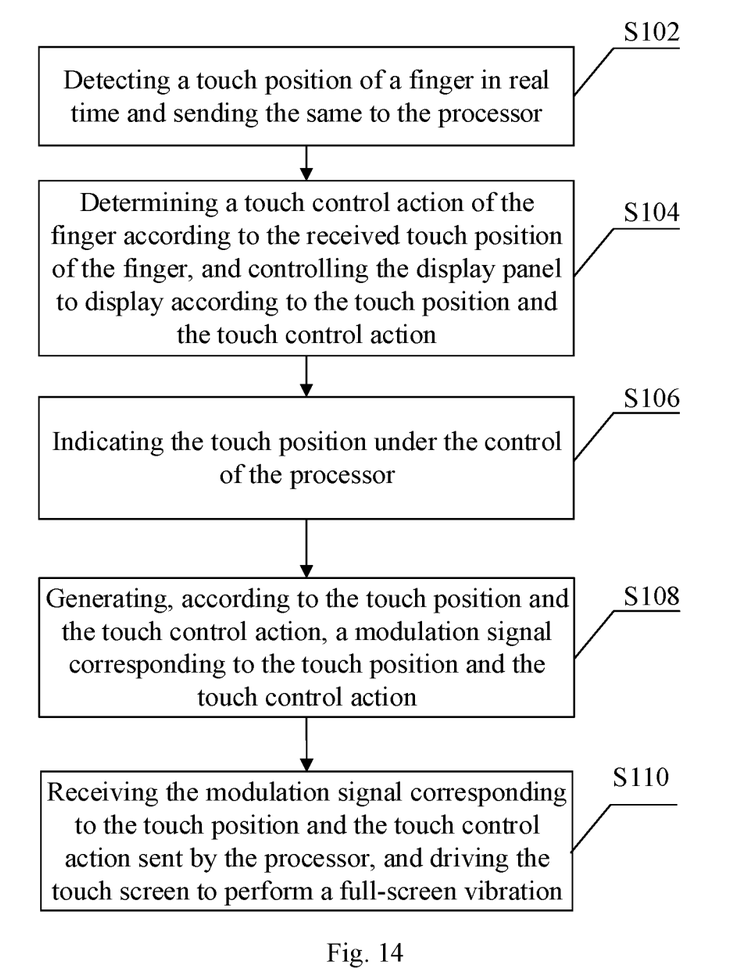
FIG. 14 is a flowchart of a touch control method for a display device according to an embodiment of the present disclosure.

FIG. 14 is a flowchart of a touch control method for a display device according to an embodiment of the present disclosure. As shown in FIG. 14, the touch control method for the display device includes the following steps.

At S102, a touch position of a finger is detected in real time and sent to the processor.

At S104, a touch control action of the finger is determined according to the received touch position of the finger, and the display panel is controlled to display according to the touch position and the touch control action.

At S106, the touch position is indicated under the control of the processor,

At S108, a modulation signal corresponding to the touch position and the touch control action is generated according to the touch position and the touch control action.

At S110: the modulation signal corresponding to the touch position and the touch control action sent by the processor is received, and the touch screen is driven to perform a full-screen vibration.

Therefore, the touch control method for the display device provided by this embodiment also has the above-described advantageous effects, and the description thereof will not be repeated here.

The display device includes, but is not limited to: a radio frequency unit, a network module, an audio output unit, an input unit, a sensor, a display unit, a user input unit, an interface unit, a memory, a processor, a power supply, etc. It will be appreciated by those skilled in the art that the configuration of the display device described above is not intended to be limiting and that the display device may include more or fewer of the components as described above, or some of the components may be combined, or different arrangements of the components. In embodiments of the present disclosure, the display device includes, but is not limited to, a display, a cell phone, a tablet, a television, a wearable electronic device, a navigation display device, etc.

The display device may be: any product or component with a display function, such as a television, a display, a digital photo frame, a mobile phone, a tablet computer, and among others, the display device further includes a flexible circuit board, a printed circuit board and a back panel.

In the various method embodiments of the present disclosure, the serial numbers of various steps are not used to limit the order of various steps, and changes to the order of various steps also fall within the scope of the present disclosure for a person of ordinary skill in the art without involving any inventive effort.

It should be noted that the various embodiments described herein are described in a progressive manner, and the same or similar parts throughout the various embodiments can be referred to each other, with each embodiment focusing on differences from the other embodiments. In particular, the method embodiments are described more simply because they are substantially similar to the product embodiments, description of which can be referred to the description of the product embodiments.

Unless defined otherwise, technical or scientific terms used in this disclosure shall have the ordinary meaning as understood by one of ordinary skill in the art to which this disclosure belongs. The terms "first", "second", and the like as use herein do not denote any order, quantity, or importance, but rather are used to distinguish one element from another. The terms "include" or "comprise", and the like, means that the presence of an element or item preceding the word encompasses the presence of the element or item listed after the word and equivalents thereof, but does not exclude other elements or items. The terms "connect" or "connected" and the like are not limited to physical or mechanical connections, but may include electrical connections, whether direct or indirect. The terms "upper", "lower", "left", "right" and the like are used only to indicate relative positional relationships that may change accordingly when the absolute position of the object being described changes.

It will be understood that when an element such as a layer, film, region or substrate is referred to as being "on" or "under" another element, it can be "directly on" or "directly under" the other element or intervening elements may be present.

In the description of the embodiments above, particular features, structures, materials, or characteristics may be combined in any suitable manner in any one or more embodiments or examples.

The foregoing are merely specific embodiments of the present disclosure, but the protection scope of the present disclosure is not limited thereto. Changes and substitutions that would be readily conceived by one of ordinary skill in the art when reading the disclosure, fall within the protection scope of the present disclosure. Therefore, the protection scope of the present disclosure is set forth in the appended set of claims.

What is claimed is:

1. A display device, comprising: a display panel, a touch screen disposed on the display panel, and a processor connected to the display panel and the touch screen; wherein the display panel comprising a display area and a non-display area;
   the touch screen is configured to detect a touch position of a finger in real time and sending the touch position to the processor;
   the processor is configured to determine a touch control action of the finger according to the received touch position of the finger, and to control the display panel to display according to the touch position and the touch control action;
   the display panel is configured to:
   display a progress bar; the progress bar comprising N sections, N is a positive integer; each section comprising: one first scale point, a plurality of second scale points and a plurality of scale intervals, one scale interval of the plurality of scale intervals is located between the one first scale point and one of the plurality of second scale points, or between two corresponding scale points of the plurality of second scale points; and
   the progress bar is a circle or a strip; and
   indicate the touch position of the finger on the progress bar under the control of the processor by displaying a progress bar indicator for indicating the touch position of the finger on the progress bar; wherein,
   the display device further comprises: a driver located in the non-display area of the display panel;
   the processor is further configured to generate, according to the touch position and the touch control action, a modulation signal corresponding to the touch position and the touch control action; and
   the driver is configured to receive the modulation signal corresponding to the touch position and the touch control action sent by the processor, and to drive the touch screen to perform a full-screen vibration;
   wherein the processor, when generating, according to the touch position and the touch control action, the modulation signal corresponding to the touch position and the touch control action, is further configured to:
   generate a first modulation signal in a case that the progress bar is a circle or a strip, the touch position is located at a first scale point in the first to N-th sections, and the touch control action is a staying action; or
   generate a second modulation signal in a case that the progress bar is the circle or the strip, the touch position of the finger is located at a second scale point in the first to N-th sections, and the touch control action is the staying action; or generate a third modulation signal in a case that the progress bar is the circle, the touch position of the finger is located at a scale interval in the first to N sections, and the touch control action of the finger is a clockwise rotating or a counterclockwise rotating; or generate fourth to (N+3)-th modulation signals in a case that the progress bar is in strip-shaped, the touch position of the finger is located in the scale intervals of the first to N-th sections, and the touch control action of the finger is an action of sliding up and down or an action of sliding left and right.

2. The display device according to claim 1, wherein the touch control action is one of the following: a staying action, a clockwise rotating, a counterclockwise rotating, an action of sliding up and down, and an action of sliding left and right.

3. The display device according to claim 1, wherein the first modulation signal and the second modulation signal are the same or different.

4. The display device according to claim 3, wherein the first modulation signal and the second modulation signal are both tone burst signals; and
the first modulation signal and the second modulation signal being different comprises:
amplitude of the tone burst signal of the first modulation signal is greater than amplitude of the tone burst signal of the second modulation signal; wherein
the tone burst signal comprises one or more sinusoidal signals of full cycle.

5. The display device according to claim 4, wherein a frequency of the sinusoidal signal of the tone burst signal ranges from 100 Hz to 1 KHz, and the number of repeated cycles of the tone burst signal ranges from 5 to 20.

6. The display device according to claim 1, wherein the third modulation signal is a sinusoidal signal, with a frequency of 20 KHz to 100 KHz, the number of repeated cycles of 200 to 2000, and amplitude of 50 V to 200 V.

7. The display device according to claim 1, wherein the fourth to (N+3)-th modulation signals each is a signal of a sinusoidal signal superposed by a Sinc function, and Sinc functions for the fourth to (N+3)-th modulation signals are different in amplitude and frequency.

8. The display device according to claim 1, wherein,
the display panel, when being configured to indicate the touch position under the control of the processor, is further configured to:
indicate the touch position of the finger on the progress bar with the progress bar indicator under the control of the processor.

9. A touch control method for a display device, the display device comprising a display panel, a touch screen disposed on the display panel, and a processor connected to the display panel and the touch screen; the display panel comprising a display area and a non-display area; the display device further comprising: a driver located in the non-display area of the display panel; wherein the method comprises:
detecting a touch position of a finger in real time and sending the touch position to the processor;
determining a touch control action of the finger according to the received touch position of the finger, and controlling the display panel to display according to the touch position and the touch control action;
displaying a progress bar; the progress bar comprising N sections, N is a positive integer;
each section comprising: one first scale point, a plurality of second scale points and a plurality of scale intervals, one scale interval of the plurality of scale intervals is located between the one first scale point and one of the plurality of second scale points, or between two corresponding scale points of the plurality of second scale points; and the progress bar is a circle or a strip; and
indicating the touch position of the finger on the progress bar under the control of the processor by displaying a progress bar indicator for indicating the touch position of the finger on the progress bar;
generating, according to the touch position and the touch control action, a modulation signal corresponding to the touch position and the touch control action; and
receiving the modulation signal corresponding to the touch position and the touch control action sent by the processor, and driving the touch screen to perform a full-screen vibration;
wherein the generating, according to the touch position and the touch control action, a modulation signal corresponding to the touch position and the touch control action comprises:
generating a first modulation signal in a case that the progress bar is a circle or a strip, the touch position is located at a first scale point in the first to N-th sections, and the touch control action is a staying action; or
generating a second modulation signal in a case that the progress bar is the circle or the strip, the touch position of the finger is located at a second scale point in the first to N-th sections, and the touch control action is the staying action; or
generating a third modulation signal in a case that the progress bar is the circle, the touch position of the finger is located at a scale interval in the first to N sections, and the touch control action of the finger is a clockwise rotating or a counterclockwise rotating; or
generating fourth to (N+3)-th modulation signals in a case that the progress bar is in strip-shaped, the touch position of the finger is located in the scale intervals of the first to N-th sections, and the touch control action of the finger is an action of sliding up and down or an action of sliding left and right.

* * * * *